United States Patent
Arakeri et al.

(10) Patent No.: US 9,409,107 B2
(45) Date of Patent: Aug. 9, 2016

(54) FILTER CARTRIDGE END PLATE FOR USE IN REMOVING A FILTER CARTRIDGE FROM A SHELL

(71) Applicant: Cummins Filtration IP, Inc., Columbus, IN (US)

(72) Inventors: Sudhindra Palaxha Arakeri, Shahapur (IN); Hariprasad Mohan Bhalerao, Pune (IN); Tanmay Puranik, Pune (IN)

(73) Assignee: Cummins Filtration IP, Inc., Columbus, IN (US)

( * ) Notice: Subject to any disclaimer, the term of this patent is extended or adjusted under 35 U.S.C. 154(b) by 1 day.

(21) Appl. No.: 14/484,021

(22) Filed: Sep. 11, 2014

(65) Prior Publication Data

US 2016/0023142 A1 Jan. 28, 2016

(30) Foreign Application Priority Data

Jul. 28, 2014 (IN) ............................ 3681/CHE/2014

(51) Int. Cl.
*B01D 29/15* (2006.01)
*B01D 35/00* (2006.01)

(52) U.S. Cl.
CPC ............. *B01D 35/005* (2013.01); *B01D 29/15* (2013.01); *B01D 2201/295* (2013.01); *B01D 2201/4061* (2013.01)

(58) Field of Classification Search
CPC ................. B01D 2201/40; B01D 2201/2201; B01D 2201/4007; B01D 2201/4046; B01D 2201/4053; B01D 2201/4061; B01D 2201/4076; B01D 2201/291; B01D 2201/295; B01D 2201/305; B01D 29/15; B01D 35/005; B01D 2201/4038
See application file for complete search history.

(56) References Cited

U.S. PATENT DOCUMENTS

| | | | | |
|---|---|---|---|---|
| 2,732,075 A * | 1/1956 | Bender | .................. | B01D 27/02 210/249 |
| 3,486,626 A * | 12/1969 | Close | .................. | B01D 29/111 210/232 |
| 4,416,775 A * | 11/1983 | Halbich | ............... | B01D 35/303 210/236 |
| 4,735,716 A * | 4/1988 | Petrucci | ............... | B01D 24/105 210/232 |
| 4,915,831 A * | 4/1990 | Taylor | .................... | B01D 35/30 206/1.5 |
| 5,211,846 A * | 5/1993 | Kott | ....................... | B01D 29/21 210/232 |
| 5,925,245 A * | 7/1999 | Bradford | ............... | B01D 35/30 210/232 |
| 6,299,661 B1 * | 10/2001 | Bloomer | .............. | F02M 35/021 55/385.3 |
| 6,458,269 B1 * | 10/2002 | Bassett | .................. | B01D 27/08 210/119 |
| 6,984,319 B2 * | 1/2006 | Merritt | .................. | B01D 29/15 123/196 A |

(Continued)

FOREIGN PATENT DOCUMENTS

EP          2789375 A1 * 10/2014 ............. B01D 29/21

*Primary Examiner* — David C Mellon
(74) *Attorney, Agent, or Firm* — Foley & Lardner LLP

(57) ABSTRACT

A filter cartridge including an improved endplate configured to enable a user to remove the filter cartridge from a shell without the use of external tools. The filter cartridge includes a filter media, a first endplate coupled to a first end of the filter media, and a second endplate coupled to a second end of the filter media. The second endplate includes at least one tab formed therein along an outer peripheral surface thereof. Each tab defines a pocket formed therein, via which the user may grasp the endplate and thereby remove the filter cartridge from the shell by hand.

5 Claims, 7 Drawing Sheets

(56) References Cited

U.S. PATENT DOCUMENTS

| | | |
|---|---|---|
| 7,648,565 B2 † | 1/2010 | Clausen |
| 8,057,669 B2 * | 11/2011 | Beard .................. B01D 29/114 210/232 |
| 8,167,966 B2 | 5/2012 | Amirkhanian et al. |
| 8,206,482 B2 * | 6/2012 | Williams ........... B01D 46/2414 156/184 |
| 8,973,760 B2 * | 3/2015 | Ries ..................... B01D 36/006 210/440 |
| 2006/0070942 A1 * | 4/2006 | An ........................ B01D 35/30 210/433.1 |
| 2009/0241315 A1 | 10/2009 | Menez et al. |
| 2011/0168621 A1 * | 7/2011 | Wieczorek ........... B01D 17/045 210/487 |

\* cited by examiner
† cited by third party

FILTER CARTRIDGE END PLATE FOR USE IN REMOVING A FILTER CARTRIDGE FROM A SHELL

CROSS-REFERENCE TO RELATED APPLICATIONS

The present application claims priority to India provisional patent application number 3681/CHE/2014, filed Jul. 28, 2014 and the contents of which are incorporated herein by reference.

TECHNICAL FIELD

The present disclosure relates generally to filter cartridges for use in fluid filtration systems.

BACKGROUND

Replaceable filter elements and assemblies including such filter cartridges have proven to be useful components of filtration systems for applications in internal combustion engines such as diesel engines. Replaceable filter cartridges can be provided along with other components of filtration systems to provide assemblies operable to filter liquids such as fuel, oil and other lubricants, hydraulics, and others.

In many fuel filtration systems, a filter cartridge is positioned within a housing or shell, with the shell then mating with other portions of the fuel filtration system. A lower endplate of the filer cartridge includes a gasket which forms a seal with an inner surface of the shell, thereby separating filtered (clean) fuel from unfiltered (dirty) fuel during operation of the engine system. Over time, the gasket has a tendency to swell or expand, resulting in an overcompression between the filter cartridge and the shell As a result, when it is time to replace the filter cartridge, it can be difficult to physically separate the filter cartridge from the shell. In this situation, a tool typically must be used in order to physically separate the filter cartridge from the shell.

FIG. 1 is a perspective view of a portion of a conventional fuel filtration assembly, showing the process by which a conventional filter cartridge 100 is removed from a filter shell 110 of the fuel filtration assembly via the use of a tool. As shown in FIG. 1, individual projections 120 extending from an endplate 130 of the filter cartridge 100 mate with recesses 140 formed in an upper surface of the filter shell 110. The close tolerance between each projection 120 and the corresponding recess 140, in combination with the tight seal between the other endplate's gasket and the shell's inner surface, results in a situation where someone wishing to replace the filter cartridge 100 must use a tool 150 (such as a screwdriver) to pry the projections 120 from the corresponding recesses 140. However, this technique of using a tool 150 can be problematic; the use of a tool may damage the shell 110 in certain situations. More particularly, the tool 150 could damage the recesses 140 in the shell, making it difficult to install a new filter cartridge 100. The tool 150 could also generate debris, which may go into the shell 110 and increase the possibility of "dirty zones" appearing in the shell 110. Still further the use of the tool 150 may result in personal injury due to misuse and/or accidents. Finally, in situations where there is little clearance space, there may be so little space to even use the tool 150 for the removal of the filter cartridge 100.

SUMMARY

Various embodiments provide for a filter cartridge comprising a filter media having a first end and a second end, a first endplate coupled to the first end of the filter media, and a second endplate coupled to a second end of the filter media. The second endplate includes at least one tab formed therein along an outer peripheral surface of the second endplate. In a particular embodiment, two tabs are formed, with each tab positioned at substantially opposite sides of the outer peripheral surface of the second endplate. Each tab defines a pocket that is graspable by a user when the filter cartridge is installed within a shell of a fluid filtration system. Each tab and pocket are sized and positioned such that the user may remove the filter cartridge from the shell via the two tabs without the use of external tools.

These and other features, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
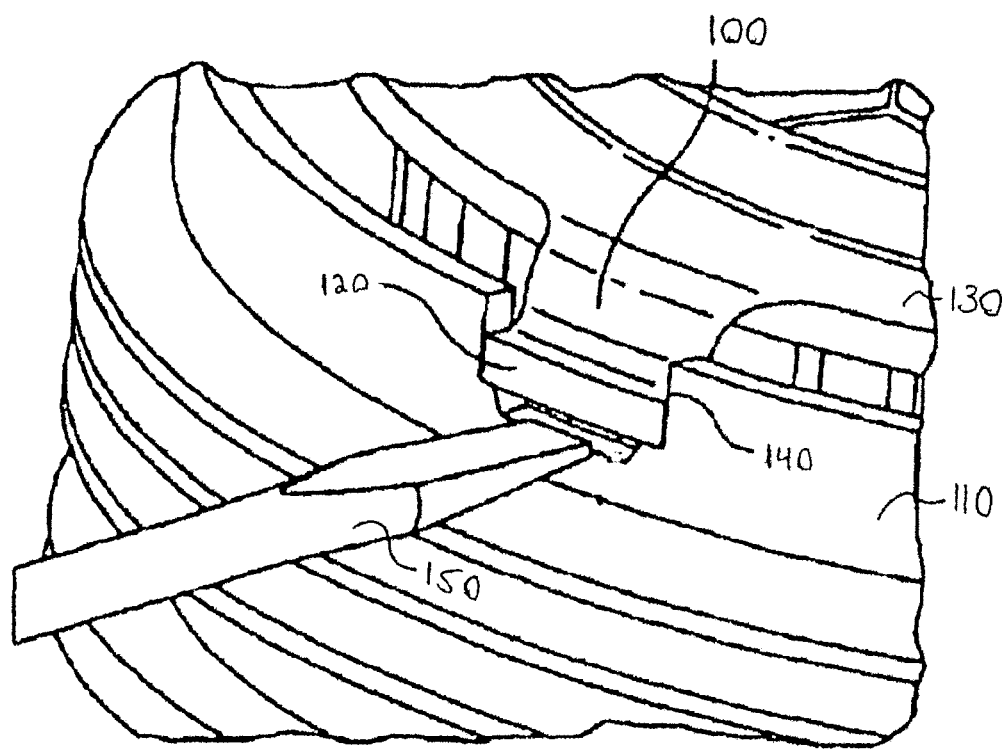
FIG. 1 is a perspective view of a portion of a conventional fuel filtration assembly, showing the process by which a conventional filter cartridge is removed from a shell of the fuel filtration assembly via the use of a tool.
Figure 2:
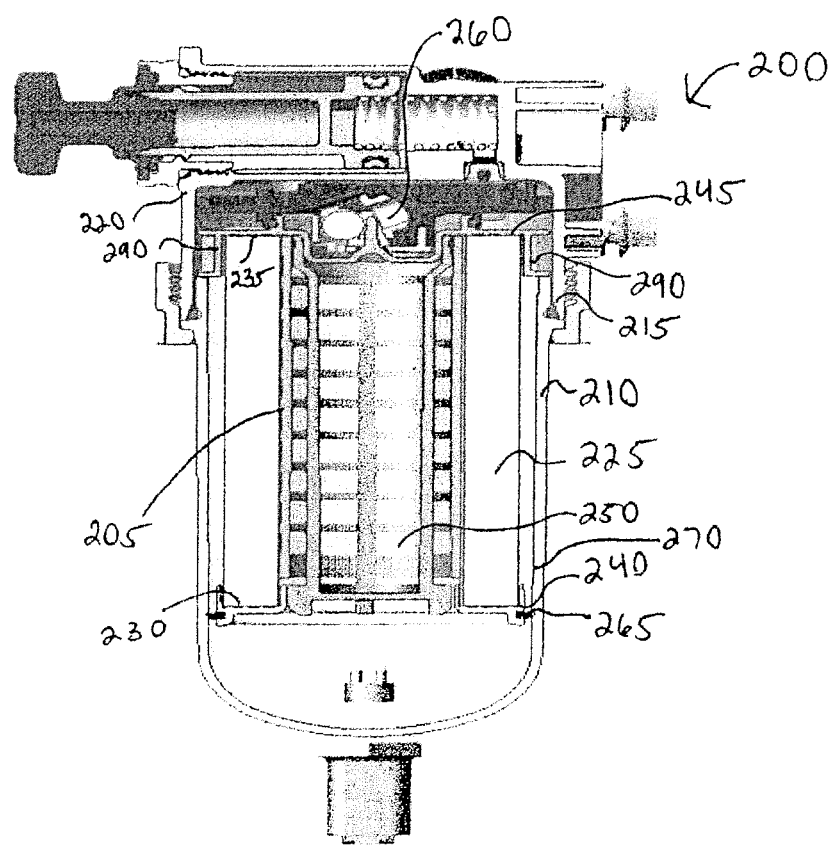
FIG. 2 is a sectional view of a fuel filtration system constructed in accordance with a particular embodiment.

FIG. 2 is a sectional view of a fuel filtration system 200 constructed in accordance with a particular embodiment. The fuel filtration system 200 includes a filter cartridge 205 positioned within a filter shell 210. When correctly installed, the filter shell 210 mateably engages a receptacle 215 of a filter head 220. The filter cartridge 205 includes a filter media 225 having a first end 230 and a second end 235. A lower endplate 240 is coupled to the first end 230 of the filter media 225, and an upper endplate 245 is coupled to the second end 235 of the filter media 225. In the embodiment depicted in FIG. 2, the filter media 225 is substantially cylindrical in shape (although this shape may be varied as necessary or desired) and includes a hollow interior 250. The filter media 225 may take a variety of forms, i.e., the filter media 225 may be paper-based, foam-based, cotton-based, etc. The filter media 225 can also be formed of nanofibers, it may form a plurality of pleats, and other configurations and structures are also possible.

During operation, fuel enters the fuel filtration system 200 via a fuel inlet. Fuel flows through the filter media 225 and is filtered by the filter media 225, passing from the outside of the filter media 225 to the hollow interior 250. After passing through the filter media 225, fuel passes through a fuel outlet 260 and proceeds to the engine (not shown) for combustion.

As noted above, the filter cartridge 205 includes a lower endplate 240 and an upper endplate 245. The lower endplate 240 includes a gasket 265 or o-ring positioned along an outer periphery thereof. The gasket 265 is sized and positioned to abut against an interior surface 270 of the filter shell 210. When the filter cartridge 205 is installed within the filter shell 210, the gasket 265 is compressed between the lower endplate 240 and the interior surface 270, thereby forming a seal which prevents unfiltered fuel from passing to the clean, filtered side of the filter media 225 without first passing through the filter media 225. In an alternative embodiment, for there may be no seal formed between the lower endplate 240 and the interior surface 270. Such an embodiment may be used, for example, when the filter cartridge 205 is only being used for coarse water separation (as opposed to fine water separation).

Figure 3:
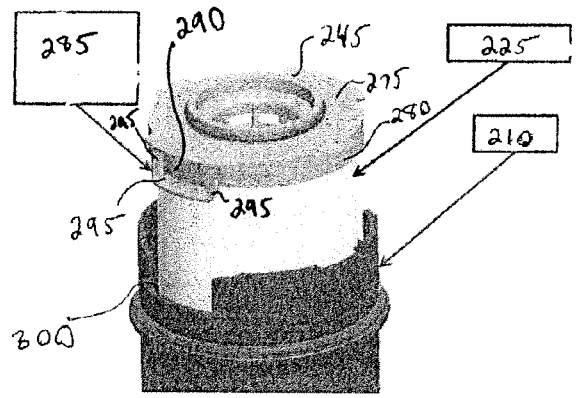
FIG. 3 is perspective view showing the filter cartridge and the shell of FIG. 2 in a partially separated and aligned state.
Figure 5:
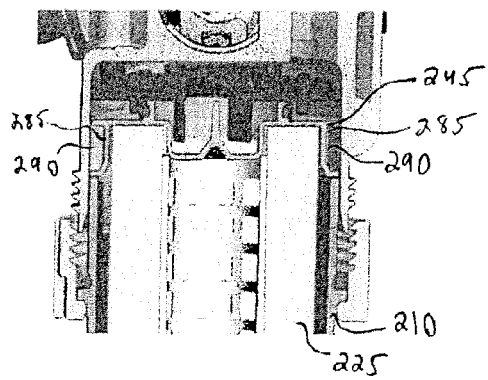
FIG. 5 is a sectional view of the fuel filtration system of FIG. 2, when the filter cartridge and the shell are misaligned.

FIG. 3 is a perspective view showing the filter cartridge 205 and the filter shell 210 in a partially separated state. As shown in FIG. 3, the upper endplate 245 includes an upper planar surface 275 and a peripheral sidewall 280 extending therefrom. The peripheral sidewall 280 includes one or more tabs 285 formed therein, with each tab 285 defining a pocket 290 therein. As best shown in FIGS. 2 and 5, the peripheral sidewall 280 includes two tabs 285 positioned on substantially opposite sides of the peripheral sidewall 280, i.e., about 180 degrees from each other. However, it is possible for both the number of tabs 285 and their respective locations to vary.

Figure 6:
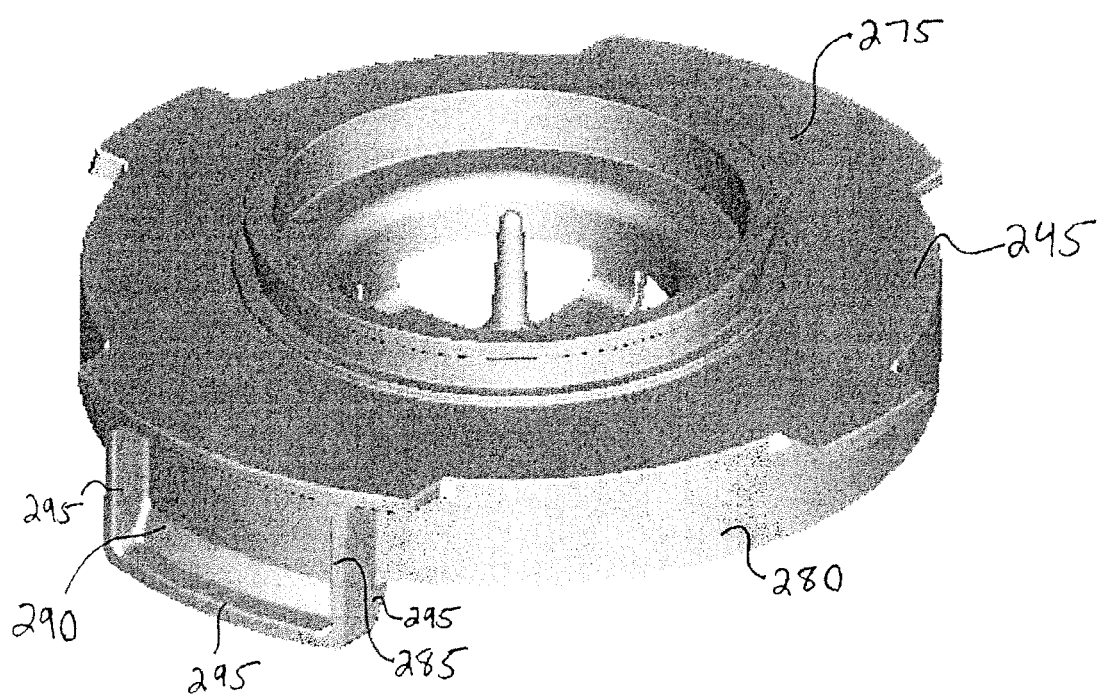
FIG. 6 is a perspective view of an endplate of the filter cartridge of FIGS. 2-5.
Figure 7:
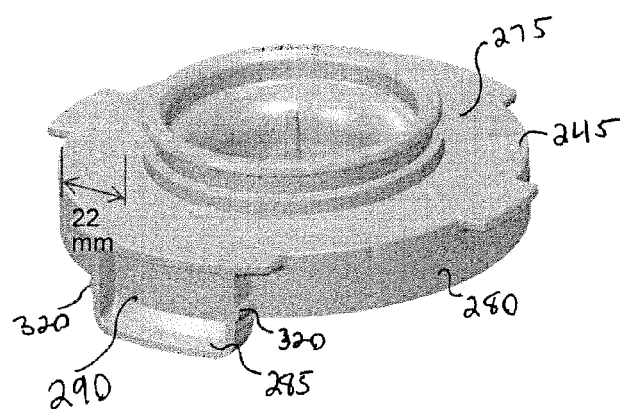
FIG. 7 is a perspective view of an endplate for a filter cartridge constructed according to another embodiment.
Figure 8:
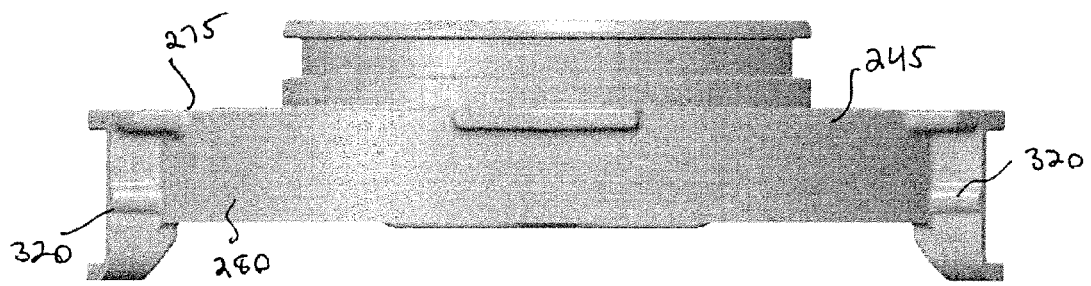
FIG. 8 is a side view of the endplate of FIG. 7.

As best shown in FIGS. 3 and 6, each pocket 290 is defined by a portion of the upper planar surface 275 and each of a plurality of tab walls 295. In the embodiment shown in FIGS. 3 and 6, there are three distinct tab walls 295 used in forming each pocket, with each tab wall 295 being forming a substantially ninety degree angle with each adjacent tab wall 295 and/or the upper planar surface 275. However, it is possible for the number and orientation of tab walls 295 to vary.

Each pocket 290 is essentially an indentation within which the tip of one or more human finger or thumb may be positioned. The precise depth of each pocket 290 may vary (i.e., each pocket does not have to be identical in depth to every other pocket 290), and the depth can vary within individual pockets 290. As shown as FIGS. 2 and 5, however, the depth of each pocket is not insubstantial in that it enables a person to place his or her thumb tip or finger tip(s) within the pocket, thereby providing the person with a firm grip with which to pull the filter cartridge 205 out of the filter shell 210 while using only his or her hand(s).

Figure 4:
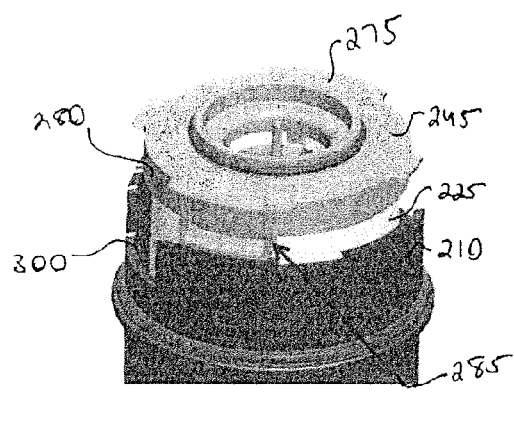
FIG. 4 is a perspective view showing the filter cartridge and the shell of FIG. 2 in a partially separated and misaligned state.

As best shown in FIGS. 3 and 4, the filter shell 210 may also include one or more shell recesses 300 which are sized and positioned to correspond to the tabs 285 of the upper end plate 245. In other words, the length and width of each shell recess 300 may be substantially equal to the length and width of a corresponding tab 285, and the shell recesses 300 may be collectively positioned such that each tab 285 properly fits within a corresponding shell recess 300.

Additionally, in a particular embodiment, each tab 285 extends away from the upper planar surface 275 by a sufficient length to also provide an indication to the user of a proper installation of the filter cartridge 205 within the filter shell 210. In particular, the length of each tab 285 in a direction away from the upper planar surface 275 (and the corresponding length/depth of each recess 300 away from the open end of the filter shell 210), is such that the filter shell 210 cannot be properly installed with the rest of the fuel filtration system 200 if there is a misalignment between the filter cartridge 205 and the filter shell 210. As best shown in FIG. 5, for example, if the individual tabs 285 and shell recesses 300 are not properly aligned, then the filer cartridge 205 does not fit properly in the filter shell 210. Therefore, when one attempts to install the filter cartridge 205/filter shell 210 combination in the fuel filtration system 200, the filter shell 210 is not long enough to properly engage the receptacle 215 of the filter head 220. If, on the other hand, the tabs 285 and the shell recesses 300 are properly aligned, then the filter cartridge 205 rests more deeply within the filter shell 210, thereby allowing the top of the filter shell 210 to engage the receptacle 215.

Figure 9:
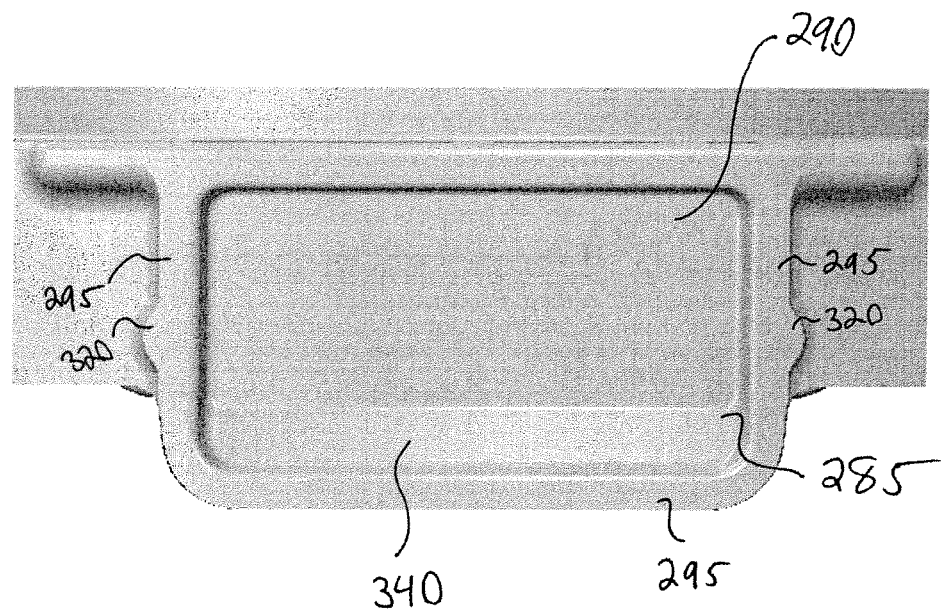
FIG. 9 is a front view showing an individual tab of the endplate of FIG. 7.
Figure 10:
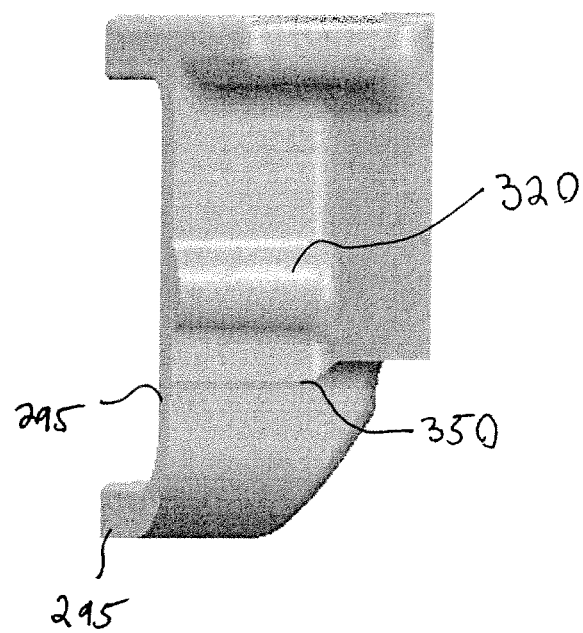
FIG. 10 is an isometric, sectional side view showing a portion of the tab of FIG. 9.
Figure 11:
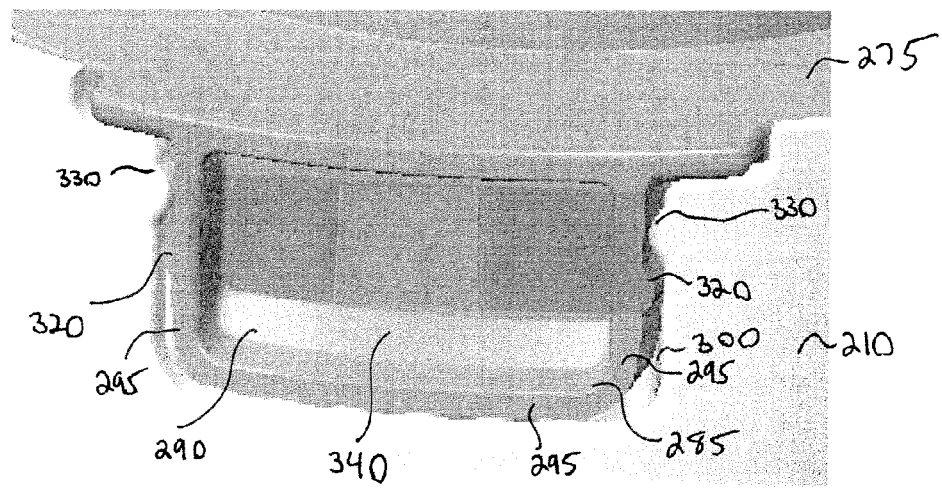
FIG. 11 a isometric view of a portion of the endplate of FIG. 7, showing the interaction between an individual tab and an associated filter shell.
Figure 12:
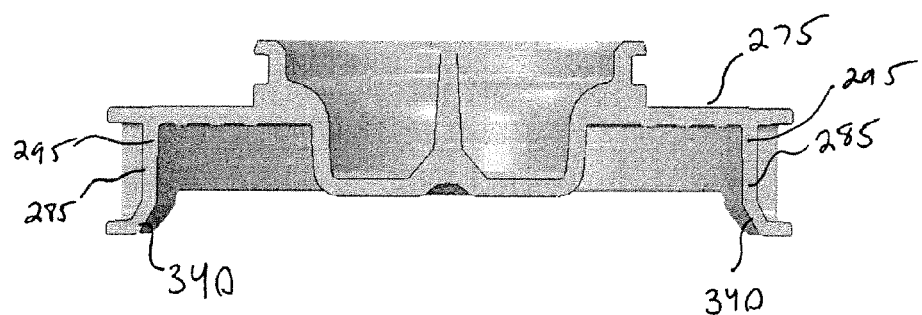
FIG. 12 is a cross-sectional view of the endplate of FIG. 7.

FIGS. 7-12 depict various views of an upper endplate 245 constructed in accordance with another exemplary embodiment. The upper endplate 245 is similar in a number of respects to what is depicted in FIGS. 2-6, although a number of differences are also provided. As best shown in FIGS. 9, 11 and 12, for example, the pocket 290 is defined, in part, by a chamfered surface 340, as opposed to a more substantially vertical rear surface. Additionally, for the tab walls 295 which define the left and right sides of the tabs 285, there is a parting line 350 (where the contour of the respective tab wall 295 changes) that is more elevated than is presented in the embodiment of FIGS. 2-6. Both the parting line 350 and the chamfered surface 340 may be further modified in other implementations.

In addition to the above, the embodiment depicted in FIGS. 7-12 includes individual tab ribs 320 formed on the outside of the respective left and right tab walls 295. Similar filter shell ribs 330 are formed on the side walls of the individual shell recesses 300. The tab ribs 320 and the filter shell ribs 330 are sized and positioned such that the individual tabs 285 can "snap fit" within the shell recesses 300. This enables the formation of a more secure connection between the filter cartridge 205 and the filter shell 210. As shown in FIGS. 7-11, the tab ribs 320 may have a rounded shape, although the size and shape of the tab ribs 320 may be modified in various ways while still providing the requisite snap fit functionality. Additionally, while one tab rib 320 is depicted on each side of the tab 285 in FIGS. 7-11, it also possible for there to only be a single tab rib 320 within each tab 285, or more than two tab ribs 320 to be associated with each tab 285.

The following is a process by which a filter cartridge 205 (including the endplate 245 of FIGS. 7-11) may be installed within a filter shell 210. After a filter cartridge 205 is provided, the filter cartridge 205 is aligned with the filter shell 210 in a manner such that each tab 285 is aligned with a respective recess 300 formed along an edge of the filter shell 210. The filter cartridge 205 is then inserted into the filter shell 210 such that each tab 285 is positioned partially or completely within a respective recess 300. During this insertion process, each tab rib 320 engages and then disengages with a respective filter shell rib 330, essentially positioning each respective tab rib 320 between a filter shell rib 330 and the bottommost portion of the recess 300. This result in a snap fit arrangement between the filter cartridge 205 and the filter shell 210.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter assembly, comprising:
a filter shell; and
a filter cartridge sized for insertion within the filter shell, the filter cartridge comprising:
   a filter media having a first end and a second end;
   a first endplate coupled to the first end of the filter media; and
   a second endplate coupled to the second end of the filter media, the second endplate including at least one tab formed therein along an outer peripheral surface of the second endplate, the at least one tab including at least one tab rib extending therefrom, the at least one tab rib positioned for selective engagement with the filter shell, each of the at least one tab defining a pocket exposed to and graspable by a user when the filter cartridge is installed within the filter shell,
wherein the filter shell includes at least one recess formed along an edge thereof, the at least one recess positioned such that at least a portion of each of the at least one tab is positioned within a respective recess when the filter cartridge is properly installed within the filter shell.

2. The filter assembly of claim 1, wherein the at least one tab comprises two tabs positioned on substantially opposite sides of the outer surface of the second endplate.

3. The filter assembly of claim 2, wherein the at least one tab rib comprises two tab ribs positioned on substantially opposite sides of each of the two tabs.

4. The filter assembly of claim 3, wherein the at least one recess comprises two recesses, and wherein each of the two recesses includes a filter shell rib on substantially opposite sides thereof.

5. The filter assembly of claim 4, wherein each tab rib is positioned to selectively engage a respective filter shell rib during installation of the filter cartridge within the filter shell, thereby creating a snap fit arrangement between the filter cartridge and the filter shell.

* * * * *